2,842,593

METHOD OF PREPARATION AND PURIFICATION OF THE HIGHER ALIPHATIC DI-ACIDS

Charles Paquot, Paris, Roger Perron, Chatenay-Malabry, and Josiane Petit, Villeneuve-le-Roi, France, assignors to Etablissement Public dit: Centre National de la Recherche Scientifique, Paris, France, a corporation of France No Drawing. Application August 8, 1955
Serial No. 527,172

Claims priority, application France August 10, 1954

12 Claims. (Cl. 260—537)

The present invention relates to the preparation of the higher aliphatic di-acids from esters of saturated fatty acids, subjected to the action of fuming nitric acid (which may contain in certain cases concentrated sulphuric acid).

Experience has shown that the efficiency of a reaction of this kind depends to a large extent on the conditions in which it is carried out, and in particular on the proportions and degree of concentration of the oxidising agent employed, as well as the separation of the mono-acids which accompany the formation of the di-acids.

On the other hand, it is known that the higher aliphatic di-acids are of value as raw material for various subsequent syntheses, which value is enhanced by the fact that these di-acids can be obtained from hydrogenated greases or oils, and especially from tallow, which thus gives this latter product an excellent market value.

The present invention has for its main object improvements in the method of obtaining the higher aliphatic di-acids by nitric oxidation of long saturated aliphatic chains of derivatives of fatty acids, these improvements being the results of observations made by the inventors, and which are more especially directed to the determination of the best experimental conditions to be established in order to obtain an optimum production of di-acids and in order to separate the mono-acids from the di-acids.

The invention is essentially characterised by the following facts:

Beginning the reaction by a short heating period, as may be required, one part by weight of an ester or polyester of a saturated higher fatty acid or of a mixture of esterified saturated higher fatty acids and about one and a half parts by weight of pure freshly-distilled nitric acid having a density between 1.50 and 1.52, are caused to react for a period of the order of ten to twelve minutes, at the end of which period the two phases formed are separated by decantation.

The nitric acid may be replaced with advantage by a sulpho-nitric mixture formed preferably of one part by volume of sulphuric acid at 66° Baumé and of 10 parts by volume of pure nitric acid having a density comprised between 1.50 and 1.52.

The treatment of the mass of the said esters which have not been converted is repeated a certain number of times, using the same quantity of oxidising agent, the decanted products obtained during the course of each treatment being added together. The treatment is continued in this way until the fatty matter phase has disappeared.

The product resulting from the nitric oxidation is treated without delay by saturated chlorinated solvent, for example chloroform or dichloro-ethane and the whole is then washed with water until it is neutral to methyl red. The non-aqueous phase is then dried and distilled so as to eliminate the chlorinated solvent, and to separate out a certain quantity of volatile organic products (in particular, the lower methylic esters).

The organic mass thus obtained, which mainly consists of the di-acids with a certain proportion of mono-acids, is subjected to an extraction process by boiling petroleum ether.

The resulting solution is then brought to and maintained at low temperature (at least 10° C. below zero) and the temperature is then raised to about +10° C. The solution is then rapidly filtered, thus separating out the insoluble di-acids from the soluble mono-acids which remain in solution. This cycle of operations (cooling, heating, filtration) is repeated as long as any di-acids continue to separate from the solution containing the mono-acids.

The organic mass which is insoluble in the boiling petroleum ether is subjected in the same way to the action of cyclo-hexane and provides in the same conditions a further quantity of di-acids. By evaporation of the residual solutions from the treatment by petroleum ether, there are obtained mono-acids in the form of a mixture of lower, medium and higher fatty mono-acids.

The evaporation of the residual cyclo-hexanic solutions gives rise to a complex mixture of products which contain, amongst others, nitrated derivatives.

In accordance with this technique, di-acids are obtained with a high efficiency, the number of carbon atoms of which varies from $C_{10}$ to $C_{15}$, and which, after very thorough purification, have a melting point in the neighbourhood of 95° C. and an average acid index equal to about 460.

The organic mass which is insoluble in boiling petroleum ether may be treated by another method; it is melted with a certain quantity of mono-acids and the mixture is then re-treated with boiling petroleum ether so as to yield when cooled a further quantity of di-acids and a further insoluble organic mass, which can be treated several times in the manner already described.

As far as the conditions of production are concerned, it should be observed that the oxidation is carried out by means of fuming nitric acid of a density in the neighbourhood of 1.52, which has been freshly-distilled and is practically free from nitrous vapours, and to which is preferably, but not necessarily, added a little sulphuric acid at 66° Baumé with the object of accelerating the process. The high concentration of the nitric acid employed is made necessary by the fact that, when nitric acid has a density of the order of 1.50 and above, such an acid, or a mixture of such acid with sulphuric acid, cannot start the reaction, or starts it only with great difficulty and when the temperature is raised, for example.

The reactions which are produced may start up by themselves or by heating; they only lead to advantageous production of di-acids if the fatty mass is treated by small partial additions of the sulpho-nitric mixtures necessary to effect a complete disappearance of this mass. After each of the corresponding reactions, a decantation of the two phases should be carried out, each reaction being usually only repeated after the elimination of the lower nitric phase which exists after the preceeding reaction. This process is continued until the layer of the higher fatty mass is exhausted. This method of operation, furthermore, permits of an economy in reagent, a control of the evolution of the system and a smaller overall time of contact.

In addition, it has been found that any addition of fatty substances during the course of an operation does not result in the production of the quantity of di-acids which would correspond to the added substance. For this reason, it is preferable to repeat the operation several times.

The most suitable sulpho-nitric mixture has been found to be composed of one part by volume of sulphuric acid at 66° Baumé to ten parts by volume of nitric acid of a density 1.50 to 1.52. However, widely different compositions of these mixtures still enable the desired oxidation to be effected, generally, however, with smaller quantities produced of di-acids.

In the case in which the fatty and nitric phases separate badly by decantation during the course of the operation, this drawback can be remedied either by lowering the temperature of the mass of reaction, or by the addition of a little water to this mass followed by stirring for a short time; these two methods of producing decantation may also be combined, it being noted that, in addition, the geometry of the system may have an influence on the decantation.

In connection with the separation of the di-acids from the mono-acids, it has been observed that aliphatic di-acids are only very silghtly soluble in petroleum ether. On the other hand, if they are associated with mono-carboxylic fatty acids, the solubility of the mixture in this solvent is then very much increased. Furthermore, a solution of such a mixture in petroleum ether, cooled to below −10° C., produces the formation of crystals of the higher fatty di-acids and mono-acids, the latter passing again into solution when the solution considered is brought back to atmospheric temperature, so as then to leave practically only the di-acids in the crystalline state.

The apparent association of the higher aliphatic di-acids and fatty mono-acids, soluble in petroleum ether and irreversibly dissociable by low temperatures, has been made use of in the separation of these substances, the first resuming, after this separation, their natural, very low solubility in the solvent in question.

In these conditions, the whole of the process of extraction of the fatty di-acids and mono-acids described above, is justified by the fact that, on the one hand the petroleum ether is not able readily to dissolve the di-acids obtained unless they are accompanied in particular by fatty mono-acids, while the said di-acids, once isolated, are practically insoluble in this solvent, and that on the other hand, the two solvents prescribed (the cyclohexane dissolving the higher aliphatic di-acids when hot but not when cold) each contribute in the concentration of the various impurities in one final insoluble phase.

In order to carry this method into effect, any known arrangements can be utilised, operating either non-continuously or semi-continuously, which resist in particular the action of nitric acid or of the sulpho-nitric mixture, and which comprise in addition the necessary apparatus for recovery of the oxidising mixture, continuously if so desired, this being carried out in accordance with known methods, for example by distillation under vacuum or drawing-off by injection of air or of inert gases.

In principle, the transformation of the esters of the higher fatty acids to di-acids may be carried out in a reaction chamber suitably arranged so as to permit of decantation of the lower sulpho-nitric layers, and the recovery of the nitrous vapours formed during the reaction, these vapours being readily recovered by known methods. The treatment of the sulpho-nitric layers containing the mixture of the di-acids and the mono-acids may be effected in any evaporator which enables the nitric acid to be recovered by any known means, and it is advantageous to carry out this treatment as rapidly as possible.

By way of indication and without any implied limitation, there will now be described examples of the application of the method in accordance with the invention in connection with the treatment of methyl stearate, of tri-stearide and of hydrogenated tallow.

*Example 1.—Transformation of methyl stearate*

10 grams of pure methyl stearate were introduced into a reaction chamber having a cross-section of 30 sq. cm. and a height of 12 cm. To this was then added 10 cu. cm. of a sulphonitric mixture composed of one part by volume of sulphuric acid at 66° Baumé and 10 parts by volume of nitric acid having a density of 1.52, this density not being due, to any appreciable extent, to dissolved nitrous vapours; the reaction is started by a short heating period if it does not start spontaneously. After having left the reaction to develop for a period of 10 to 12 minutes, at the end of which time the decantation of the two phases was correctly completed, the lower sulpho-nitric layer was eliminated and led off to the evaporator.

This same operation was then repeated eight times more, the last operation resulting in the complete disappearance of the higher fatty layer, which only gave a single phase after the reaction. In addition, there was recovered by evaporation 45 cu. cm. of nitric acid having a density of 1.51 and which only contained very small quantities of dissolved nitrous vapours; this result should simply be taken as a minimum by reason of the low efficiency of the evaporator which was employed to carry out this part of the operation.

The residual mass obtained in the evaporator was re-treated with 75 cu. cm. of chloroform, and the whole was washed with water until it was neutral to methyl red. The chloroform phase, dried and evaporated in order to eliminate the solvent, then gave 7.8 grams of organic material.

This organic matter was then successively extracted with boiling petroleum ether and boiling cyclo-hexane, these treatments then leaving an insoluble residual final mass of 0.1 grams. The hot solutions of petroleum ether and cyclo-hexane were then cooled down to a low temperature (at least −10° C.) and then reheated to +10° C. In each case, there was thus formed a precipitate of higher aliphatic di-acids. After rapid filtration of the two systems and evaporation of each of the two filtrates, there were obtained: in the case of the petroleum ether, 3.4 grams of raw higher aliphatic di-acids (acid index 416, saponification index 455, melting point 55° C.), and a residue of evaporation of the filtrate of 3.2 grams, composed for the greater part of fatty acid of various atomic contents of carbon, having an average acid index of 317, a saponification index of 328 and a melting point of 28 to 31° C.; and in the case of the cyclo-hexane, 0.2 gram of di-acids having a composition in the neighbourhood of those previously referred to, and a residue of evaporation of the filtrate of 0.4 gram of various products.

The analysis for 100 parts by weight of methyl stearate is as follows: raw higher aliphatic di-acids—36 parts; raw fatty mono-acids—32 parts; various—5 parts; with a loss of 5 parts of volatile products which takes place during the successive evaporations of the solvents following the extractions with petroleum ether and cyclo-hexane.

*Example 2.—Treatment of tri-stearide*

The operations were carried out as previously, on 10 grams of pure tri-stearide. Eight additions, each of 10 cu. cm. of sulpho-nitric mixture were required in order to cause the fatty phase to disappear.

There was recovered by evaporation 36 cu. cm. of nitric acid having a density of 1.51.

The remaining mass was re-treated with 75 cu. cm. of chloroform and the chloroform solution was then washed with water until it was completely neutral. The chloroform base was dried and gave by evaporation of the solvent 7.05 grams of organic matter.

Extraction by petroleum ether:
    Di-acids _____grams__ 2.3
    Residue of evaporation_____do____ 3.4
Extraction by cyclo-hexane:
    Di-acids _____do____ 0.2
    Residue of evaporation_____do____ 0.3

Analysis of results:

| | | |
|---|---|---|
| Di-acids | grams | 2.5 |
| Index of saponification | | 497 |
| Acid index | | 421 |
| Melting point | °C | 52 |
| Mono-carboxylic fatty acids | grams | 3.4 |
| Average index of saponification | | 345 |
| Acid index, average | | 298 |
| Melting point | °C | 30 |
| Various | grams | 0.30 |
| Loss of volatile products | do | 0.85 |

*Example 3.—Treatment of hydrogenated tallow*

The raw tallow should be freed from mucilage and purified before use, after which it is hydrogenated. The pre-treatments indicated are necessary, failing which the first reaction may be very violent with the result that troublesome emulsions are produced during the course of washing with water of the chloroform solution.

By operating as already indicated for the methyl stearate on 10 grams of purified and hydrogenated tallow, having an index of saponification of 197, an acid index of 4 and an iodine index of 4, 9 additions of 10 cu. cm. each of the sulpho-nitric mixture were necessary in order to cause the fatty phase to disappear.

The evaporation of the decanted sulpho-nitric solution produced 44 cu. cm. of nitric acid having a density of 1.51.

The chloroform solution, washed until it is completely neutral, and then dried, gave by evaporation of the solvent, 6.9 grams of organic matter.

Extraction by petroleum ether:

| | | |
|---|---|---|
| Di-acids | grams | 2.3 |
| Residue of evaporation | do | 3.1 |

Extraction by cyclo-hexane:

| | | |
|---|---|---|
| Di-acids | do | 0.2 |
| Residue of evaporation | do | 0.5 |

Analysis of results:

| | | |
|---|---|---|
| Di-acids | do | 2.5 |
| Index of saponification | | 460 |
| Acid index | | 410 |
| Melting point | °C | 47 |
| Mono-carboxylic fatty acids | grams | 3.1 |
| Index of saponification | | 342 |
| Acid index | | 306 |
| Melting point | °C | 31 |
| Various | gram | 0.5 |
| Losses in volatile products | do | 0.8 |

It should be observed that for the raw material, all the esters or poly-esters of fatty acids may be utilised, either alone or in mixtures. The best productive results are, however obtained with the lower esters such as the methyl and ethyl esters.

The invention is also directed, by way of new industrial products, on the one hand to the mixture of di-acids, and on the other hand the mixture of mono-acids or the mixture of di-acids and mono-acids which are obtained in conformity with the method forming the object of the invention, from esters of saturated fatty acids rich in $C_{18}$ and having in the raw state the following main characteristics:

| | Di-acids | Mono-Acids |
|---|---|---|
| Melting point, °C | 47 to 55 | 28 to 31 |
| Average acid index | 410 to 421 | 300 to 317 |
| Average index of saponification | 455 to 495 | 300 to 345 |

What we claim is:

1. An improved method of preparation of the higher aliphatic di-acids by nitric oxidation of hydrocarbon chains of esters of saturated higher fatty acids, the said method comprising the steps of: causing to react together one part by weight of an aliphatic saturated ester of a saturated higher fatty acid and one and a half parts by weight of pure nitric acid having a density between 1.50 and 1.52; continuing the reaction for a period of ten to twelve minutes; separating the two phases thus produced by decantation; and repeating the sequence of operations above-specified a number of times, applying each time the same quantity of nitric acid to the unconverted residue of the said ester until the phase of fatty substance has disappeared, the products thus successively separated by the decantation steps being collected together.

2. A method as claimed in claim 1, in which the said one and a half parts by weight of nitric acid are replaced by one and a half parts by weight of a sulphonitric mixture composed of one part by volume of sulphuric acid at 66° Baumé and 10 parts by volume of nitric acid having a density between 1.50 and 1.52.

3. A method as claimed in claim 1, in which the said reaction is effected between one part by weight of a mixture of aliphatic saturated esters of a saturated higher fatty acid and one and a half parts by weight of pure nitric acid of a density between 1.50 and 1.52.

4. An improved method of preparation of the higher aliphatic di-acids by nitric oxidation of hydrocarbon chains of esters of saturated higher fatty acids, the said method comprising the steps of: causing to react together one part by weight of an ester of a poly-alcohol of a fatty acid and one and a half parts by weight of pure nitric acid having a density between 1.50 and 1.52; continuing the reaction for a period of ten to twelve minutes; separating the two phases thus produced by decantation; and repeating the sequence of operations above-specified a number of times, applying each time the same quantity of nitric acid to the unconverted residue of the said ester, until the phase of fatty substance has disappeared, the products thus successively separated by the decantation steps being collected together.

5. A method as claimed in claim 4, in which the said reaction is effected between one part by weight of a mixture of esters of poly-alcohols of a fatty acid and one and a half parts by weight of pure nitric acid of a density between 1.50 and 1.52.

6. An improved method of preparation of the higher aliphatic di-acids by nitric oxidation of hydrocarbon chains of esters of saturated higher fatty acids, the said method comprising the following steps: causing to react together, one part by weight of an aliphatic saturated ester of a saturated higher fatty acid and one and a half parts by weight of a sulpho-nitric mixture composed of one part by volume of sulphuric acid at 66° Baumé and ten parts by volume of nitric acid having a density between 1.50 and 1.52; continuing the said reaction for a period of ten to twelve minutes; separating the two phases thus produced by a decantation process; repeating the sequence of operations above-specified a number of times, applying the same quantity of oxidising agent to the unconverted residue of the said ester until the phase of fatty substance has disappeared; treating the resulting product with a saturated chlorinated solvent; washing the chlorinated solvent phase with water until it is neutral to methyl red; drying and evaporating the said neutral phase to remove the solvent; extracting the resulting organic product successively with boiling petroleum ether and boiling cyclo-hexane; cooling the product down to at least minus 10° C.; subsequently re-heating the said product to plus 10° C.; filtering rapidly the products obtained following each said extraction with petroleum ether and each said extraction with cyclo-hexane; and evaporating each respective filtrate.

7. The process of claim 6 wherein the saturated chlorinated solvent is chloroform.

8. The process of claim 6 wherein the saturated chlorinated solvent is dichloroethane.

9. An improved method of preparation of the higher aliphatic di-acids by nitric oxidation of hydrocarbon chains of esters of saturated higher fatty acids, the said method comprising the following steps: causing to react together, one part by weight of an aliphatic saturated ester of a saturated higher fatty acid and one and a half parts by weight of a sulpho-nitric mixture composed of one part by volume of sulphuric acid at 66° Baumé and ten parts by volume of nitric acid having a density between 1.50 and 1.52; continuing the said reaction for a period of ten to twelve minutes; separating the two phases thus produced by a decantation process; repeating the sequence of operations above-specified a number of times, applying the same quantity of oxidising agent to the unconverted residue of the said ester until the phase of fatty substance has disappeared; treating the resulting product with a saturated chlorinated solvent; washing the chlorinated solvent phase with water until it is neutral to methyl red; drying and evaporating the said neutral phase to remove the solvent; extracting the resulting organic product with boiling petroleum ether; melting the organic mass insoluble in said petroleum ether with a quantity of mono-acids which will permit dissolving in said ether the greatest portion of organic materials originally insoluble in said ether, treating said mixture with boiling petroleum ether; cooling the product down to at least minus 10° C.; subsequently re-heating said product to plus 10° C.; filtering rapidly the resultant product; and evaporating the resultant filtrate, the cycle of operations following the said extraction process being repeated until no more di-acids are obtained by crystallization in petroleum ether.

10. The process of claim 9 wherein the saturated chlorinated solvent is chloroform.

11. The process of claim 9 wherein the saturated chlorinated solvent is dichloroethane.

12. The process of claim 9 wherein the mono-acids are obtained from the previous oxidation reaction.

References Cited in the file of this patent

UNITED STATES PATENTS

| | | |
|---|---|---|
| 2,269,998 | Czerwin | Jan. 13, 1942 |
| 2,369,036 | Fitzpatrick et al. | Feb. 6, 1945 |
| 2,459,219 | Duke | Jan. 18, 1949 |
| 2,614,122 | Mikeska | Oct. 14, 1952 |
| 2,662,908 | Logan | Dec. 15, 1953 |

OTHER REFERENCES

Euler et al.: Arkiv för Kemi, vol. 1, 1949–50 (pp. 307–308).

Euler et al.: Chem. Abstracts, vol. 44 (1950), col. 6817–18.